US 6,624,780 B1

(12) United States Patent
Fouts et al.

(10) Patent No.: US 6,624,780 B1
(45) Date of Patent: Sep. 23, 2003

(54) FALSE TARGET RADAR IMAGE GENERATOR FOR COUNTERING WIDEBAND IMAGING RADARS

(75) Inventors: Douglas Jai Fouts, Salinas, CA (US); Phillip E. Pace, Castroville, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/267,094

(22) Filed: Oct. 2, 2002

(51) Int. Cl.[7] ................................................. G01S 7/38
(52) U.S. Cl. ........................... 342/14; 342/25; 342/194; 342/195
(58) Field of Search ............................. 342/13, 14, 15, 342/25, 194, 195

(56) References Cited

U.S. PATENT DOCUMENTS 5,424,742 A * 6/1995 Long et al. ................... 342/25
5,430,445 A * 7/1995 Peregrim et al. ............. 342/25
6,411,249 B1 * 6/2002 Rose ............................. 342/13

OTHER PUBLICATIONS

"Some system considerations for electronic countermeasures to synthetic aperture radar", Condley, C.J.; Electronic Warfare Systems, IEE Colloquium on , Jan. 14, 1991 pp.: 8/1–8/7.*

* cited by examiner

Primary Examiner—John B. Sotomayor
(74) Attorney, Agent, or Firm—Donald E. Lincoln

(57) ABSTRACT

A system for generating a false target radar image for countering wideband synthetic aperture and inverse synthetic aperture imaging radar systems to prevent a selected target from being detected by such radar systems comprises a receiver system for producing a digital signal that represents an incident radar signal. A phase sampling circuit is connected to the receiver for sampling the digital signal and providing phase sample data. An image synthesizer circuit is connected to the phase sampling circuit and arranged to receive the phase sample data therefrom. The digital image synthesizer circuit is arranged to process the phase sample data to form a false target signal, which is input to a signal transmitter system arranged to transmit the synthesized false target signal so that it can be received by a radar system.

21 Claims, 2 Drawing Sheets

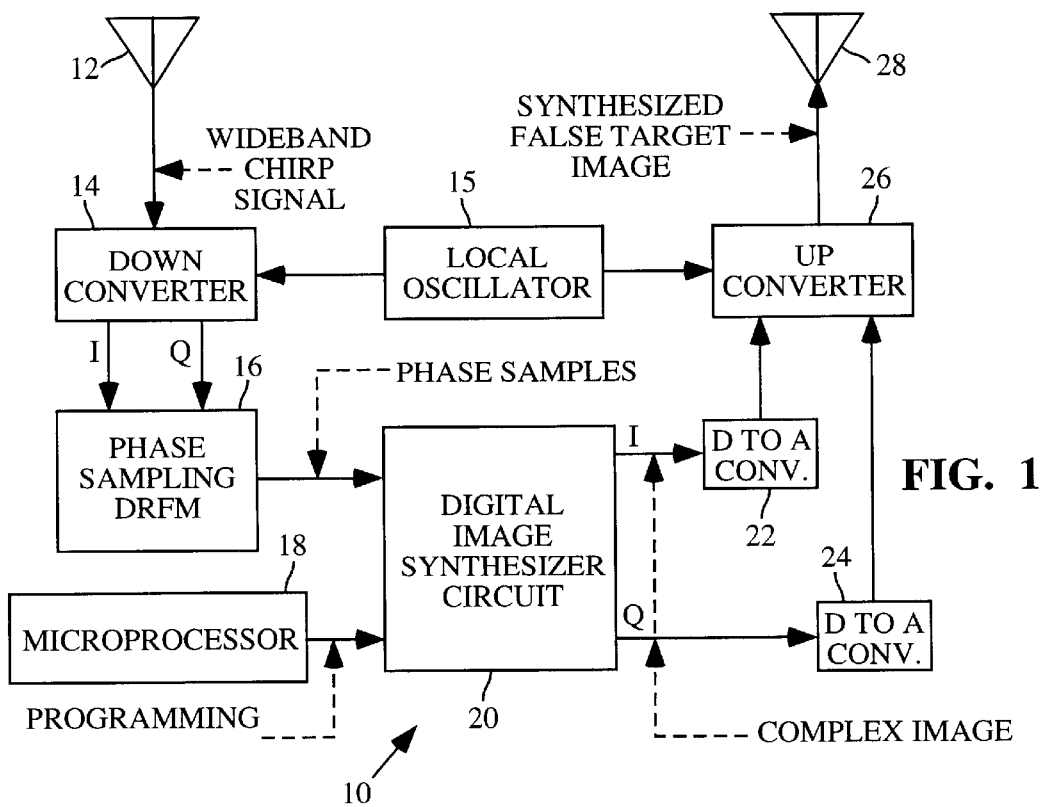
FIG. 1
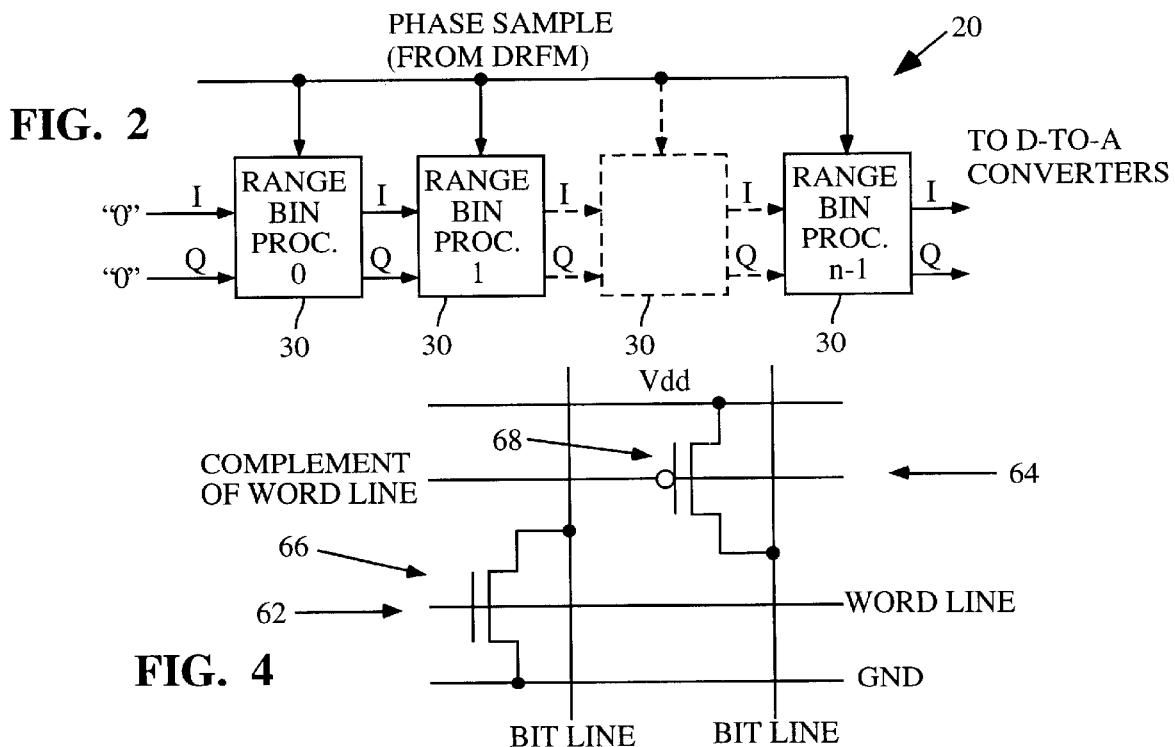
FIG. 2
FIG. 4

FALSE TARGET RADAR IMAGE GENERATOR FOR COUNTERING WIDEBAND IMAGING RADARS

BACKGROUND OF THE INVENTION

This invention relates generally to electronic countermeasures for protecting a target from adversary radar systems and radar guided weapons. This invention relates particularly to generating a false target radar image for countering wideband synthetic aperture and inverse synthetic aperture imaging radars.

Modern shipboard and airborne wideband synthetic aperture radars (SARs) and inverse synthetic aperture radars (ISARs) are capable of generating images of target objects. Such imaging capability is an advantage over previous technology because it improves the ability to identify the specific type of target, distinguish friend from foe, accurately guide weaponry, and defeat electronic protection such as false target decoys. Thus, modern wideband imaging SARs and ISARs create a difficult ship defense problem. For example, if an adversary is using a wideband imaging ISAR, an electronic protection system cannot synthesize a false target by just transmitting a signal that emulates a radar return off a single or a few scattering surfaces. Instead, such a transmitted signal must emulate a coherent sequence of reflections with the proper delay, phase, and amplitude that is similar to what would come from the multiple scattering surfaces at multiple ranges (distances from the radar) of an actual ship.

Analog methods for generating false radar targets have included the use of acoustic charge transport (ACT) tapped delay lines and fiber optic tapped delay lines. ACT devices are no longer commercially available and also have limited bandwidth, making them impractical against wideband imaging radars. Optical devices are bulky and costly to manufacture, especially for the longer delay line lengths needed to synthesize a false target image of even a moderately sized ship.

SUMMARY OF THE INVENTION

An object of the present invention provides a system and method for producing false target images for both small and large targets, even up to the size of an aircraft carrier.

Another object of the invention is to provide a false target image generation system that is fully programmable.

A system according to the present invention for generating a false target radar image for countering wideband synthetic aperture and inverse synthetic aperture imaging radar systems to prevent a selected target from being detected by such radar systems comprises a receiver system for producing a signal that represents an incident radar pulse. A phase sampling circuit is connected to the receiver for sampling the signal and providing phase sample data. An image synthesizer circuit is connected to the phase sampling circuit and arranged to receive the phase sample data therefrom. The digital image synthesizer circuit is arranged to process the phase sample data to form a false target signal, which is input to a signal transmitter system arranged to transmit the synthesized false target signal so that it can be received by a radar system.

The receiver system preferably comprises a down-converting radar receiver for producing an output in response to a received radar signal. An oscillator is connected to the down converter for providing a reference signal thereto. The down converter is arranged to process the reference signal and the wide-band chirp signal to produce a signal component I that is in phase and a component Q that is in quadrature with the wideband chirp signal. The phase sampling circuit preferably comprises a phase sampling digital radio frequency memory connected to the down converter to receive the signals I and Q therefrom. The image synthesizer circuit is arranged to calculate numerical values of in-phase and quadrature components of the false target signal.

The transmitter system preferably comprises a pair of digital to analog converters connected to the image synthesizer circuit and arranged to produce analog signal components corresponding to the false target in-phase and quadrature digital image signal components. An up converter is connected to the pair of digital to analog converters and to the local oscillator. The up converter is arranged to convert the analog signal components into a synthesized false target image signal that is input to a signal transmitter arranged to transmit the synthesized false target image signal so that it can be received by a radar system.

The image synthesizer circuit preferably comprises a linear array of range bin processors (RBPs) arrange to calculate numerical values for the false target in-phase and quadrature digital image signals. The range bin processors preferably operate under the control of a microprocessor. Each of the range bin processors preferably comprises a phase rotation adder having inputs connected to the microprocessor and to the phase sampling digital radio frequency memory. The phase rotation adder is arranged to add phase rotation data received from the microprocessor to phase samples received from the phase sampling digital radio frequency memory to produce a signal with a rotated phase angle. A read only memory is arranged to receive the phase rotation signal from the phase rotation adder and provide output signals that indicate the sine and cosine of the phase rotation angle. A first summation adder is arranged to add the sine signal to a partial Q summation of sine signals from the previous range bin in the linear array and produce a new partial Q summation that is input to the next range bin in the array. A second summation adder is arranged to add the cosine signal to a partial I summation of cosine signals from the previous range bin in the linear array and produce a new partial I summation that is input to the next range bin in the array.

The system according to the present invention preferably further comprises a phase rotation buffer connected to the microprocessor to receive the phase rotation data therefrom, and a phase rotation register connected between the phase rotation buffer and the phase rotation adder.

The system according to the present invention preferably also further comprises a gain buffer connected to the microprocessor to receive gain data therefrom and a gain register connected to the gain buffer. A first gain multiplier is arranged to receive the sine signal as a first input and a signal output from the gain register as a second input. The gain multiplier is further arranged to provide the sine signal to the summation adder. A second gain multiplier is arranged to receive the cosine signal as a first input and a signal output from the gain register as a second input. The gain multiplier is further arranged to provide the sine signal to the summation adder.

BRIEF DESCRIPTION OF THE DRAWINGS

FIG. 1 is a block diagram of a false target radar image synthesizer system according to the present invention;

FIG. 2 illustrates the architecture of the digital image synthesizer circuit of FIG. 1;

FIG. 4 illustrates a read only memory cell that may be included in the present invention.

DETAILED DESCRIPTION OF THE INVENTION

Figure 3:
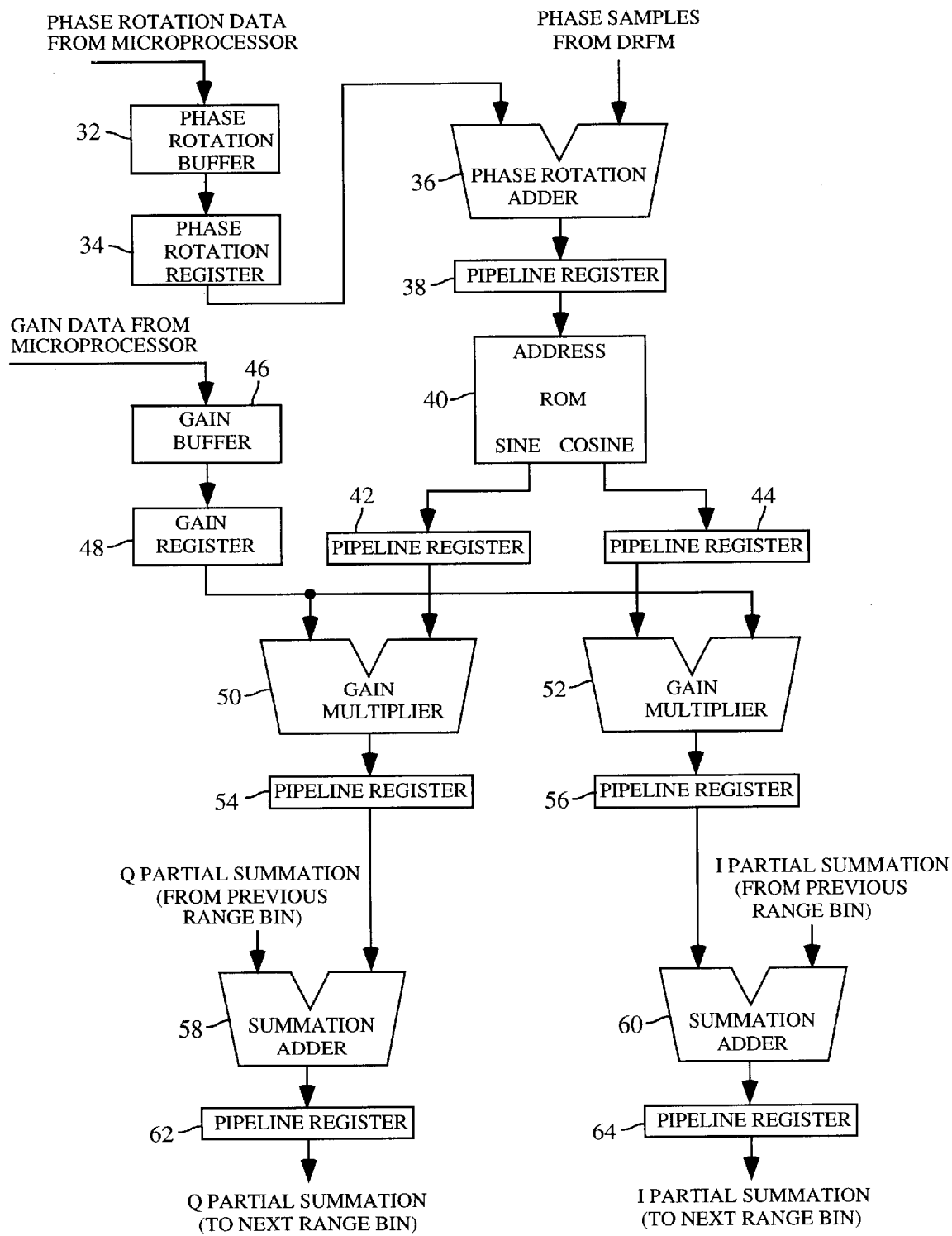
FIG. 3 illustrates the architecture of each of the range bin processors included in the architecture of FIG. 2.

A wideband chirp waveform from a modern SAR (not shown) or ISAR (not shown) has a complex signal that can be described by $$s(t) = rect\left(\frac{t}{T}\right) e^{j2\pi\left(f_c t + \frac{Kt^2}{2}\right)} \tag{1}$$

$$rect\left(\frac{t}{T}\right) = \begin{cases} 1 & \text{for } \left|\frac{t}{T}\right| < \frac{1}{2} \\ 0 & \text{for } \left|\frac{t}{T}\right| > \frac{1}{2} \end{cases} \tag{2}$$

where t is time, T is the pulse width, $f_c$ is the carrier frequency, K is the chirp rate, and $\Delta$ is the linear frequency sweep or the bandwidth of the transmitted signal. Such wideband chirp signals are reflected back to the radar system from a target such as a ship or aircraft and then processed to form an image of the target.

As shown in FIG. 1, a false target radar image synthesizer system 10 according to the present invention includes a receiving antenna 12 that receives a wideband chirp signal from a SAR or ISAR system in a conventional manner. The antenna 12 is connected to an amplifier (not shown) that provides an electrical signal that corresponds to the chirp signal to a down converter 14. A local oscillator 15 provides a reference signal to the down converter 14, which resolves the signal from the signal receiver into a component I that is in-phase and a component Q that is in quadrature with the received wideband chirp signal. The signal components I and Q are input to a phase sampling digital radio frequency memory (DRFM) 16. Alternatively, an in-phase/quad (I/Q) DRFM could also be used with an I/Q-to-phase conversation circuit between the DRFM and the digital image synthesizer.

The DRFM 16 and a microprocessor ($\mu$P) 18 are arranged to provide signal inputs to a digital image synthesizer (DIS) 20 that is preferably formed as an application specific integrated circuit (ASIC), but could also be implemented with programmable logic devices or even off-the-shelf components. The received wideband chirp waveform, which is sometimes referred to as a radar pulse, is down converted to baseband as described by $$s(t) = rect\left(\frac{t}{T}\right) e^{j2\pi\left(f_d PRI + \frac{Kt^2}{2}\right)} \tag{4}$$

where $f_d$ is the Doppler frequency between the radar and the DIS platform intercepting the chirp signal and PRI is the pulse repetition interval. The Doppler shift is only tens of Hertz compared to the MHz chirp bandwidth. Therefore, a constant phase change within a chirp pulse can be assumed. After sampling and digitization, the phase samples are used by the DIS 20 to synthesize a complex false target image that also has in-phase and quadrature components. This image is then converted back to an analog signal by a pair of digital to analog converters 22 and 24. The analog components of the false target image are input to an up-converting transmitter 26 that is also connected to the local oscillator 15. The synthesized false target image signals are then input to a transmitting antenna 28 for transmission back to the radar system. It is possible for the receiving antenna 12 and the transmitting antenna 28 to be the same antenna by using duplexer technology. The false target radar image synthesizer system 10 operates under control of the $\mu$P 18, which also programs the DIS 20 with the parameters necessary to synthesize the false target image(s) desired by the system operator.

FIG. 2 illustrates the architecture of the DIS 20. The phase samples of the radar pulse are read out of the DRFM 16 into an array of range bin processors 20 that contains a plurality of range bins numbered 0, 1, . . . , n-1, n arranged in a linear array. The phase signals from the DRFM 16 are input into all range bin processors at the same time. Each of the range bin processors operate under the control of the $\mu$P 18 and can synthesize a radar return signal from one or more emulated scattering surfaces as long as all surfaces are in the same range bin, or at the same range, or distance, from the radar. The use of multiple range bin processors allows the synthesized false target to have many scattering surfaces at many different ranges, an especially necessary feature if the synthesized false target image is that of a large ship. The I and Q outputs of all range bins are then summed together before being applied to the DAC and up converter.

The signal processing that occurs in the DIS 20 is described by $$I(n) = \sum_{i=0}^{E} A_i \cos(\phi(n-i) + \Delta\phi_i) \tag{5}$$

$$Q(n) = \sum_{i=0}^{E} A_i \sin(\phi(n-i) + \Delta\phi_i) \tag{6}$$

where E is the extent of the false target image or the number of range bins used to generate the image, $A_i$ is the magnitude scaling factor for range bin i, $\phi(n)$ is the delayed input phase sample from the DRFM 16, and $\Delta\phi_i$ is the phase rotation coefficient for range bin i. Within each range bin, creation of Doppler modulation requires rotating the phase of the incoming sample. Then, the phase sample must be converted to a complex (I, Q) signal. Next, amplitude modulation within each range bin is used to account for the radar cross section of the scattering surface being emulated. Finally, the signals from the different range bins are summed together to generate the composite return signal.

The embodiment of the DIS 20 of FIG. 2 takes advantage of the fact that processing within each range bin is independent of the delay between range bins. The delay can be applied either to the DRFM 16 sample before the sample is processed by a range bin processor 30 or to the outputs of the gain multipliers 50 and 52 before they are summed with the outputs of other multipliers from other range bins. By applying the delay at the outputs of the gain multipliers and by using a pipelined cascade of two-input adders with the delay through each addition stage matched to the required delay between range bins, there is no need for an explicit delay element between range bins. This not only improves speed but also reduces the number of transistors required for implementation.

FIG. 3 shows a preferred architecture of each range bin 30 in the array 20. Phase rotation data from the $\mu$P 18 is input to a phase rotation buffer 32. The buffered signal then is input to a phase rotation register 34. Signals output from the phase rotation register 34 and phase samples from the DRFM 16 are added by a phase rotation adder 36 to produce a sum signal that is input to a first pipeline register 38. Signals output from the pipeline register 38 are then applied to a read only memory (ROM) 40 that contains a sine/cosine lookup table. The ROM 40 provides sine and cosine signals that are input to a second pipeline register 42 and a third pipeline register 44, respectively. The sine and cosine operations can also be performed by means other than a ROM, such as a Cordic processor, polynomial evaluation, etc.

In the meantime, gain data from the $\mu$P 18 is input to a gain buffer 46. Signals from the gain buffer 46 are input to a gain register 48. Signals from the gain register 48 are input to a first gain multiplier 50 and to a second gain multiplier 52. Signals from the second pipeline register 42 are also input to the first gain multiplier 50 while signals from the third pipeline register 44 are input to the second gain multiplier 52. Signals output from the first gain multiplier 50 and the second gain multiplier 52 are input to a fourth pipeline register 54 and to a fifth pipeline register 56, respectively. A Q partial summation from the previous range bin and the output of the fourth pipeline register 54 are input to a summation adder 58 that provides a summation signal to a sixth pipeline register 62. The sixth pipeline register then sends the Q partial summation to the next range bin in the array 20. An I partial summation from the previous range bin and the output of the fifth pipeline register 56 are input to a summation adder 60 that provides a summation signal to a seventh pipeline register 64. The seventh pipeline register then sends the I partial summation to the next range bin in the array 30.

Referring to FIG. 3, operation of the DIS 20 starts when the control microprocessor 18 (shown in FIG. 1) independently programs the phase rotation and gain for each range bin in the array 20. The double buffering arrangement shown in FIG. 3 and described previously improves performance by allowing the control microprocessor 18 to reprogram the DIS 20 while calculations using previous programming are being finished.

The phase rotation is a 4-bit unsigned number, and both the phase rotation buffer 32 and the phase rotation register 34 are 4 bits wide. Any number of bits can be used, depending on the desired phase resolution. Increasing the number of bits increases the phase resolution. In an exemplary embodiment of the invention, the gain data from the $\mu$P 18 is 2 bits, allowing gain scaling by 1, 2, 4, or 8. The gain buffer 46 and the gain register 48 preferably are 2 bits wide. The greater the number of bits, the greater the dynamic range. In this first implementation, gain multiplication is done by the powers $2^0$, $2^1$, $2^2$, and $2^3$. However, gain multiplication does not have to be restricted in this way. For example, standard, binary multiplication can also be used.

After the gain and phase coefficients are loaded, a sequence of phase samples from the DRFM 16 is clocked into the range bins via the phase rotation adder 36. Each range bin loads the same phase sample on the same clock, as shown in FIG. 2, and processes the same phase sample on the same clock.

To further improve the performance of the DIS 20, the range bin architecture shown in FIG. 3 has been heavily pipelined. Including four pipeline stages, as shown in FIG. 3, maximizes computational throughput at the cost of increased computational latency and additional hardware. To further improve performance, an optional pipeline register can be added at the phase sample input to the phase rotation adder to pipeline the data coming from the DRFM 16. The phase samples from the DRFM 16 are added to the value in the phase rotation register 34 by the phase rotation adder 36, and the result is stored in the pipeline register 38.

The samples from the DRFM 16 are 5 bits wide, and the phase rotation adder 36 typically is 5 bits wide. However, the phase increment value is only 4 bits wide. At the sacrifice of 1 bit of phase precision, the phase rotation value is shifted left 1 bit before the addition. Thus, the phase rotation adder 36 implements a modulo-32 addition and ignores overflow. Overflow can be ignored because both the sine and cosine operations that follow are periodic functions. It should be noted that the DRFM phase samples do not have to be 5 bits wide. Any number of bits can be used. The greater the number of bits the greater the phase resolution.

The output of the phase rotation adder 36 is applied to the combined sine/cosine ROM lookup table 40, via the pipeline register 38. The ROM 40 has 5 address lines and thus 32 words. Both the sine and the cosine outputs have 8 bits, thus the ROM 40 has 16 bits at each address. The sine and cosine outputs use a two's complement format that includes 7 fractional data bits and 1 sign bit. The sine and cosine outputs of the ROM 40 go to two, 8-bit, pipeline registers 42 and 44, respectively. It is not necessary to restrict the ROM to 5 address lines and 32 words, or to restrict the sine and cosine outputs to 8 bits each. The number of addresses (and words) in the ROM is usually matched to the number of bits coming out of the phase adder. The number of sine and cosine output bits is determined by the desired quantization error of the generated sine and cosine waveforms. The greater the number of bits, the less the quantization error.

The sine and cosine ROM outputs are applied to the gain multipliers 50 and 52, respectively via the indicated pipeline registers 42 and 44. The gain multipliers 50 and 52 have full-range, 11-bit outputs but are not true arithmetic multipliers. The multiplication is accomplished by shifting. This is feasible because the 2-bit gain data represents signed multiplication by 1, 2, 4, or 8, which equates to 18 dB of dynamic range. Multiplication using a shifter instead of an actual arithmetic multiplier greatly increases the performance of the DIS 20 and reduces the number of transistors required at the same time. The output of each shifter 50 and 52 goes to 11-bit pipeline register 54 and 56, respectively. It should be noted that standard, binary multiplication could be used.

After multiplication, the data from each range bin is added to the data from all the other range bins. This is accomplished using a cascade of 2-input, pipelined adders 58 and 60 that are connected to the gain multipliers 50 and 52 via pipeline registers 54 and 56, respectively. Still referring to FIG. 3, the I and Q partial summation inputs to the adders come from the outputs of the summation adders in the previous range bin, except for the range bin 0 at the far left side of the cascade of range bins in FIG. 2. For this range bin, the summation adder inputs are 0. The outputs of the summation adders 58 and 60 in each range bin i are connected to pipeline registers 62 and 64. The outputs of pipeline registers 62 and 64 are connected to the partial summation inputs of the summation adders 58 and 60 in the following range bin i+1, except for the range bin n−1 on the far right side of the cascade of range bins in FIG. 2. The summation adder outputs for this range bin are the primary outputs of the DIS 20 that go to the DACs 22 and 24. The summation adders 58 and 60 are 16-bit, ripple-carry, two's complement adders in the exemplary embodiment of the invention. This allows up to 32 range bins to be cascaded together without risk of arithmetic overflow. Many more than 32 range bins can actually be cascaded because at any given time, approximately half of the range bins will be generating negative partial results. The number of bits in the adder does not have to be restricted to 16. Any number can be used. The greater the number of bits in the adder, the greater the dynamic range of the synthesized signals.

With the design shown in FIGS. 2 and 3, the clock speed of the DIS 20 determines the range resolution of the false target image synthesized by the DIS 20 because it determines the time delay between successive range bins i and i+1. The resolution between successive range bins for the DIS 20 can be calculated from $$R_R = \frac{C}{2f_{cl}} \quad (7)$$

$$M_{SZ} = R_R \cdot N_{RB} \quad (8)$$

where $R_R$ is the range resolution, $f_{cl}$ is the clock frequency, and C is the speed of light. For a typical DRFM/DIS system operating at 500 MHz, the range resolution is 0.3 meters. Once the range resolution is known, Equation 8 can be used to calculate the maximum size of the synthesized false target image, where $M_{SZ}$ is the maximum target size and $N_{RB}$ is the number of range bins. For a typical DIS 20 with 512 range bins, the maximum size of the synthesized false target is over 150 meters, providing the capability to synthesize false images of large ships.

It is necessary to maintain a high clock frequency in order to have good range resolution of the synthesized false target image. Another advantage of maintaining a high clock speed is the reduced pipeline latency, which allows the synthesis of a false target closer to the platform hosting the DIS 20 system. A clock speed of at least 500 MHz is preferred. Another issue is the number of range bins on the DIS 20 chip. The more range bins, the larger the synthesized false target image can be. A DIS 20 containing 512 range bins and operating at clock speeds in excess of 500 MHz necessitates a full custom VLSI CMOS IC, which requires over 6 million, transistors. The DIS 20 preferably is fabricated with a 0.18 μm or smaller process to obtain the required speed. However, as the technology of programmable logic devices improves, the implementation of the DIS 20 using programmable logic devices will eventually become possible The summation adders 58 and 60 may be conventional adder circuits such as ripple-carry adders, bit-slice adders or carry look ahead adders. A ripple-carry summation adder is the slowest pipeline stage in the described design and is the limiting factor for clock speed. An exemplary embodiment of the invention uses ripple-carry adders to implement the summation adder in each range bin, instead of a high-performance carry-look-ahead adder, to reduce the number of transistors and fabrication costs.

Within each range bin, phase samples are transformed into amplitude signals using the sine and cosine operations. The 16-bit ROM 40 combines the sine and cosine tables into a single, 32-address table. To reduce the number of required transistors, the ROM 40 uses the same address decoding logic for both the sine half and the cosine half.

The ROM 40 contains a matrix of memory cells that includes both NFET pull-down transistors and PFET pull-up transistors. This is a departure from typical ROM design. FIG. 4 shows two memory cells 62 and 64 from the ROM matrix in the DIS IC. The cell 62 is programmed with a logic 0 and contains an NFET pull-down transistor 66. The cell 64 on the right is programmed with a logic 1 and contains an active PFET pull-up transistor 68. The bit lines do not have any pull up transistors. This design greatly improves the speed of the ROM 40.

What is claimed is:

1. A system for generating a false target radar image for countering wideband synthetic aperture and inverse synthetic aperture imaging radar systems, comprising:

a receiver system for producing a signal that represents an incident radar signal;

a phase sampling circuit connected to the receiver for sampling the received signal and providing phase sample data;

an image synthesizer circuit connected to the phase sampling circuit and arranged to receive the phase sample data therefrom, the digital image synthesizer circuit being arranged to process the phase sample data to form a false target signal; and a signal transmitter system arranged to transmit the synthesized false target signal so that it can be received by a radar system.

2. The system of claim 1 wherein the receiver system comprises:

a radar receiver for producing an output signal in response to a received wideband chirp signal;

a down converter connected to the radar receiver; and an oscillator connected to the down converter for providing a reference signal thereto, the down converter being arranged to process the reference signal and the wideband chirp signal to produce a signal component I that is in phase and a component Q that is in quadrature with the wide-band chirp signal, wherein the phase sampling circuit comprises a phase sampling digital radio frequency memory connected to the down converter to receive the signals I and Q therefrom.

3. The system of claim 2 wherein the image synthesizer circuit is arranged to calculate numerical values of in-phase and quadrature components of the false target signal.

4. The system of claim 2 wherein the transmitter system comprises:

a pair of digital to analog converters connected to the image synthesizer circuit and arranged to produce analog signal components corresponding to the false target in-phase and quadrature digital image signal components;

an up converter connected to the pair of digital to analog converters and to the local oscillator, the up converter being arranged to convert the analog signals from the digital to analog converters to an RF signal appropriate for amplification and transmission so that it can be received by a radar system.

5. The system of claim 4 wherein the image synthesizer circuit comprises a linear array of range bin processors arranged to calculate numerical values for the false target in-phase and quadrature digital image signals.

6. The system of claim 5 wherein phase samples from the digital radio frequency memory are simultaneously input to every range bin processor in the linear array without any delay between the range bin processors.

7. The system of claim 5 further comprising a microprocessor arranged to control the image synthesizer circuit.

8. The system of claim 7, further comprising a plurality of summation adders arranged to create the delays required between the range bin processors.

9. The system of claim 7 wherein each of said range bins comprises:

a phase rotation adder having inputs connected to the microprocessor and to the phase sampling digital radio frequency memory, the phase rotation adder being arranged to add phase rotation data received from the microprocessor to phase samples received from the phase sampling digital radio frequency memory to produce a phase rotation angle signal;

a read only memory arranged to receive the phase rotation signal from the phase rotation adder and provide output signals that indicate the sine and cosine of the phase rotation angle;

a first summation adder arranged to add the sine signal to a partial Q summation of sine signals from the next range bin processor in the linear array and produce a new partial Q summation that is input to the next range bin processor in the array; and a second summation adder arranged to add the cosine signal to a partial I summation of cosine signals from the previous range bin processor in the linear array and produce a new partial I summation that is input to the next range bin processor in the array.

10. The system of claim 9, further comprising:

a phase rotation buffer connected to the microprocessor to receive the phase rotation data therefrom;

a phase rotation register connected between the phase rotation buffer and the phase rotation adder; and wherein the phase rotation buffer and the phase rotation register are controlled such that new phase increment values can be loaded into the phase rotation buffer from the control microprocessor without affecting the phase rotation value in the phase rotation register and such that calculations using the value in the phase rotation register are allowed to proceed with out interruption and such that the new phase rotation value in the phase rotation buffer is allowed to be loaded into the phase rotation register with a single clock and to be loaded synchronously with the loading of all phase rotation registers and all gain registers in all range bin processors.

11. The system of claim 9, further comprising:

a gain buffer connected to the microprocessor to receive gain data therefrom;

a gain register connected to the gain buffer;

wherein the gain buffer and the gain register are controlled such that new gain values can be loaded into the gain buffer from the control microprocessor without affecting the gain value in the gain register, and allowing calculations using the value in the gain register to proceed without interruption, and allowing the new gain value in the gain buffer to be loaded into the gain register with a single clock and to be loaded synchronously with the loading of all gain registers and all phase rotation registers in all range bin processors;

a first gain multiplier arranged to receive the sine signal as a first input and a signal output from the gain register as a second input, the gain multiplier being further arranged to provide the sine signal to the summation adder; and a second gain multiplier arranged to receive the cosine signal as a first input and a signal output from the gain register as a second input, the gain multiplier being further arranged to provide the sine signal to the summation adder.

12. The system of claim 9, further comprising a pipelined array of adders arranged to sum signals output from all of the range bins.

13. A method for generating a false target radar image for countering wideband synthetic aperture and inverse synthetic aperture imaging radar systems comprising:

connecting a receiving antenna and a down-converting-receiver to a phase-sampling circuit to provide phase sample data;

connecting an image synthesizer circuit to the phase sampling circuit;

arranging the image synthesizer circuit to process the phase sample data to form a false target signal; and transmitting the synthesized false target signal so that it can be received by a radar system.

14. The method of claim 13, further comprising the steps of:

arranging a radar receiver for receiving a wide-band chirp signal;

connecting the radar receiver to a down-converter;

connecting an oscillator to the down converter for providing a reference signal thereto;

arranging the down converter to process the reference signal and the wide-band chirp signal to produce a signal component I that is in phase with, and a component Q that is in quadrature with, the wideband chirp signal; and forming the phase sampling circuit to comprise a phase sampling digital radio frequency memory connected to the down converter to receive the signals I and Q therefrom.

15. The method of claim 13 further comprising the step of arranging the image synthesizer circuit to calculate numerical values of in-phase and quadrature components of the false target signal.

16. The method of claim 13 further comprising the steps of:

connecting a pair of digital to analog converters connected to the image synthesizer circuit;

arranging the pair of digital to analog converters to produce analog signal components corresponding to the false target in-phase and quadrature digital image signal components;

connecting an up converter to the pair of digital to analog converters and to the local oscillator;

arranging the up converter to convert the analog signal components into an RF signal for transmission; and providing a signal transmitter arranged to transmit the RF signal so that it can be received by a radar system.

17. The method of claim 16 further comprising the step of forming the image synthesizer circuit to comprise a linear array of range bins arranged to calculate numerical values for the false target in-phase and quadrature digital image signals.

18. The method of claim 17 further comprising the step of providing a microprocessor arranged to control the image synthesizer circuit.

19. The method of claim 18 further comprising the steps of:

providing a phase rotation adder having inputs connected to the microprocessor and to the phase sampling digital radio frequency memory;

arranging the phase rotation adder to add phase rotation data received from the microprocessor to phase samples received from the phase sampling digital radio frequency memory to produce a phase rotation angle signal;

providing a read only memory arranged to receive the phase rotation signal from the phase rotation adder and provide output signals that indicate the sine and cosine of the phase rotation angle;

adding the sine signal to a partial Q summation of sine signals from the previous range bin in the linear array and produce a new partial Q summation that is input to the next range bin in the array; and adding the cosine signal to a partial I summation of cosine signals from the previous range bin in the linear array and produce a new partial I summation that is input to the next range bin in the array.

20. The method of claim 19, further comprising the steps of:

connecting a phase rotation buffer to the microprocessor to receive the phase rotation data therefrom; and connecting a phase rotation register between the phase rotation buffer and the phase rotation adder.

21. The method of claim 19, further comprising the steps of:

connecting a gain buffer to the microprocessor to receive gain data therefrom;

connecting a gain register to the gain buffer;

arranging a first gain multiplier to receive the sine signal as a first input and a signal output from the gain register as a second input;

arranging the gain multiplier to provide the sine signal to the summation adder;

arranging a second gain multiplier to receive the cosine signal as a first input and a signal output from the gain register as a second input; and arranging the gain multiplier to provide the sine signal to the summation adder.

* * * * *